United States Patent Office 3,454,561
Patented July 8, 1969

3,454,561
5-BASIC SUBSTITUTED 5,6-DIHYDRO-6-OXOMORPHANTHRIDINES
Jean Schmutz, Muri, near Bern, and Fritz Hunziker and Franz Martin Kunzle, Bern, Switzerland, assignors to Dr. A. Wander S.A., Bern, Switzerland, a corporation of Switzerland
No Drawing. Continuation-in-part of application Ser. No. 374,152, June 10, 1964. This application Dec. 18, 1967, Ser. No. 691,137
Int. Cl. C07d *41/06;* A61k *27/00*
U.S. Cl. 260—239.3                8 Claims

ABSTRACT OF THE DISCLOSURE 5-basic substituted 5,6-dihydro-6-oxomorphanthridines of the formula:

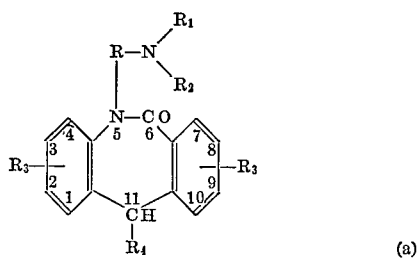

(a)

wherein R denotes straight or branched alkylene with 2 to 4 carbon atoms, $R_1$ and $R_2$ are the same or different and represent hydrogen or lower alkyl, one of both $R_3$ denotes hydrogen, the other $R_3$ is hydrogen, halogen or lower alkyl, and $R_4$ denotes lower alkyl; and (b) the therapeutically acceptable acid addition salts of (a). These compounds are adapted for use as psychopharmacological agents especially as antidepressants.

---

This is a continuation-in-part application of our copending patent applications Ser. No. 374,152, filed on June 10, 1964, and Ser. No. 526,671, filed on Dec. 29, 1965, both now abandoned.

The invention relates generally to a class of new therapeutically useful substances, and more specifically to 5-basic substituted 5,6-dihydro-6-oxomorphanthridines of the formula:

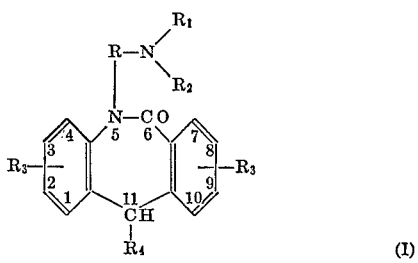

(I)

and therapeutically acceptacle acid addition salts thereof. In Formula I R denotes straight or branched alkylene with 2 to 4 carbon atoms; $R_1$ and $R_2$ are the same or different and denote hydrogen or lower alkyl; one of both $R_3$ denotes hydrogen, the other $R_3$ is hydrogen, halogen or lower alkyl; and $R_4$ denotes lower alkyl. "Lower alkyl" is intended to indicate, throughout the specification and claims, an alkyl residue having from 1 to 3 carbon atoms.

The said compounds (I) are obtained by reacting amines of the formula X—H, if desired, after prior or during simultaneous action by a condensing agent, with reactive esters of alcohols of the formula Y—R—OH. In these formulae, X and Y are mutually interchangeable.

X has the meaning of a 5,6-dihydro-6-oxo-5-morphanthridinyl residue of the formula:

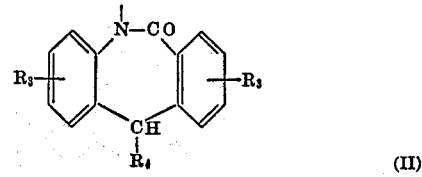

(II)

and Y has the meaning of the basic group

R, $R_1$, $R_2$, $R_3$, and $R_4$ have the meaning stated earlier.
As reactive esters of alcohols of the formula

Y—R—OH those of carbonic acid, hydrohalic acids, or sulphonic acids such as p-toluene sulphonic acid, are especially suitable. The use of a condensing agent is indicated if 5-unsubstituted lactams are reacted with hydrohalic or sulphonic acid esters. Suitable condensing agents are alkali metals, their hydrides and amides or other alkali metal compounds, e.g. sodium amide, sodium hydride, sodium ethylate, phenyl potassium, phenyl lithium, potassium tert. butoxide, and the like. If products of Formula I are to be prepared, wherein $R_1$ and/or $R_2$ denote hydrogen, the condensation may preferably be performed after previous substitution of this hydrogen by suitable protective groups, such as benzyl or allyl, which are split off subsequently by known methods, for instance, by hydrogenolysis.

The 11-alkyl-5,6-dihydro-6-oxomorphanthridines of the formula:

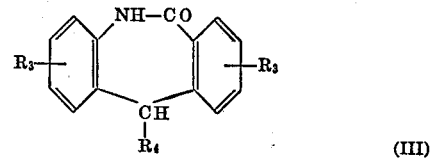

(III)

wherein $R_3$ and $R_4$ have the above-mentioned meaning, which are used in this procedure as starting materials, may be obtained with excellent yield by ring closure of correspondingly substituted o-isocyanato - 1,1 - diphenylalkanes, e.g. with the aid of aluminium chloride, the isocyanates being in turn obtained from correspondingly substituted o-amino-1,1-diphenylalkanes.

The desired compounds (I) are also obtained by cyclization of N-aminoalkylated o-amino-o'-carboxy (or alkoxycarbonyl)-1,1-diphenylalkanes of the formula:

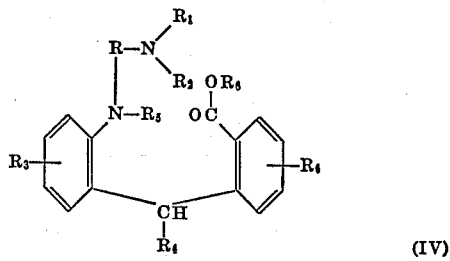

(IV)

wherein R, $R_1$, $R_2$, $R_3$, and $R_4$ have the meaning indicated above, $R_5$ represents hydrogen or an acyl residue, especially benzoyl or acetyl, and $R_6$ hydrogen or lower alkyl, with cleavage of water, an alcohol, an acid, or an ester, respectively. Ring closure is effected, according to the nature of the substituents $R_5$ and $R_6$, by moderate or strong heating of the starting compound, in the presence or absence of a suitable solvent like xylol or dioxane.

In the process mentioned above, it is not necessary to use the starting material in the form of an isolated substance. If desired, it is quite possible to combine the process with the preceding step of introducing the basic group

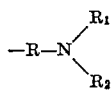

without isolation of Compound IV. In this case, an o-acyl-amino-o'-carboxy- (or alkoxycarbonyl-1,1-diphenylalkane of the formula:

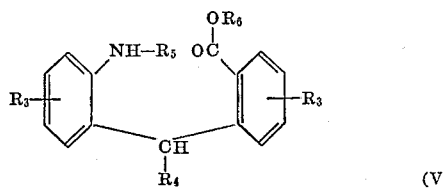

wherein $R_3$, $R_4$, $R_5$, and $R_6$ have the above-mentioned meaning, is heated in the presence of a reactive ester of a basic alkanol of the formula

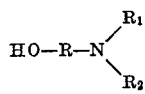

wherein R, $R_1$ and $R_2$ have the meaning stated above, for instance, with a hydrohalic acid, sulphonic acid, or carbonic acid ester, until ring closure occurs, if desired after prior or with simultaneous treatment with a condensing agent. Suitable condensing agents are alkali metals, their hydrides and amides or other alkali metal compounds, e.g. sodium amide, sodium hydride, sodium ethylate phenyl potassium phenyl lithium potassium tert. butoxide and the like. In this way the desired compound of Formula I is directly obtained as the reaction product.

Compounds of Formula I wherein $R_1$ and/or $R_2$ denote lower alkyl can also be obtained by lower alkylation of corresponding primary or secondary amines of the formula:

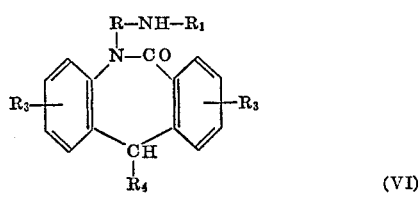

wherein R $R_1$, $R_3$ and $R_4$ have the meaning stated above. The alkylation is performed in accordance with the usual methods, for instance, by reaction of the amine (VI) with an ester, preferably a hydrohalic acid ester, of a lower alkanol, or by reaction of the amine (VI) with a lower aldehyde in the presence of a reducing agent, such as formic or hydrogen with a catalyst, in accordance with the known methods of reductive alkylation.

The starting compounds of Formula VI are in turn obtained, for instance, in accordance with one of the methods mentioned above or by reduction of corresponding nitriles.

The compounds according to Formula I produced by one of these processes can be obtained and used as the free bases or in the form of their addition salts with inorganic or organic acids. As therapeutically acceptable acid addition salts of the compounds according to Formula I mention can be made of the salts of hydrohalic acids, sulphuric, nitric, phosphoric, acetic, oxalic, malonic, succinic, maleic, malic, tartaric or toluene-sulphonic acid and the like.

The compounds of Formula I and their therapeutically acceptable acid addition salts are used as active substances in medicines or as intermediates for the manufacture of such substances. They are above all useful as psychopharmacological agents, and particularly as antidepressants. In this respect, 5-(β-dimethylaminoethyl)-11-methyl-5,6-dihydro-6-oxomorphanthridine, 5 - (β-dimethylaminoethyl)-11-ethyl - 5,6 - dihydro-6-oxomorphanthridine, 2-chloro-5-(β - dimethylaminoethyl) - 11 - methyl-5,6-dihydro-6-oxomorphanthridine and 3-chloro-5-(β-dimethylaminoethyl)-11-methyl-5,6-dihydro - 6 - oxomorphanthridine and their therapeutically acceptable acid addition salts are especially effective.

The new compounds of this invention can be administered in dosage unit form to subjects suffering from states of mental depression, these pharmaceutical preparations containing, besides the active substance, organic or inorganic solid or liquid carriers suitable for enteral or parenteral administration. The pharmaceutical preparations may be, for instance, in the form of tablets, dragees, or solutions for injection, one dosage unit containing from 40 to 120 mg. of active substance, depending on its nature, on the route of administration and one the physician's prescription, the effective daily dose amounting from 150 to 1000 mg. of active substance.

EXAMPLE 1

A mixture of 6.6 gm. of 11-methyl-5,6-dihydro-6-oxomorphanthridine, 1.5 gm. of pulverized sodium amide and 60 ml. of absolute dioxane is heated for 2½ hours at reflux. 7.8 ml. of a 5 N solution of β-dimethylaminoethylchloride in toluene are added and the whole is heated for another 4 hours under reflux. The solvent is removed from the reaction mixture by distillation in vacuo. The residue is mixed with water. After adding concentrated soda lye it is extracted with ether. The ethereal solution is washed with water and extracted with diluted hydrochloric acid. The hydrochloric extract is washed with ether and made alkaline with concentrated soda lye. An oil separates out, which is extracted with ether. The ethereal solution is washed with water and saturated sodium chloride solution, treated with active charcoal, filtered through alumina and evaporated to dryness. The residue is dissolved in a mixture of acetic ester and ethanol. The solution is acidulated with ethanolic hydrochloric acid and concentrated. Upon adding ether there are obtained 7.2 gm. (73% of the theory) of 5-β-dimethylaminoethyl-11-methyl-5,6-dihydro - 6 - oxomorphanthridine hydrochloride, which, after recrystallization from ethanol/ether, has a melting point of 239–241° C.

The 11-methyl-5,6-dihydro-6-oxomorphanthridine used in this example as a starting material is obtained in the following manner:

To 120 ml. of a 20% solution of phosgene in toluene, cooled to −10° C., a solution of 22.2 gm. of 1-(o-aminophenyl)-1-phenylethane in 200 ml. of absolute toluene is added drop by drop while stirring, taking care that the temperature does not rise above −5° C. Then the reaction mixture is brought within 20 minutes to reflux temperature while passing phosgene through it, and kept at that temperature for 15 minutes. After passing in dry nitrogen in order to drive out the excess phosgene the solvent is removed by evaporation and the residue distilled under a high vacuum. 24.8 gm. (99% of the theory) of 1-(o-isocyanatophenyl)-1-phenylethane with a boiling point of 100–105° C./0.07 mm. Hg are obtained.

While stirring, a solution of 24.5 gm. of the above compound in 150 ml. of o-dichlorobenzene is added drop by drop to a mixture, which has been heated to 80° C., of 15.4 gm. of anhydrous aluminum chloride and 150 ml. of o-dichlorobenzene. Then the temperature is raised to 140° C. and the whole is stirred at that temperature for 1½ hours. The reaction mixture is poured over ice/water. The o-dichlorobenzene is removed from the resulting emulsion by steam distillation. The residue is isolated by filtration, washed with water, dried in vacuo and dissolved in hot acetone. The hot solution is heated with active charcoal, filtered through alumina, concentrated by evaporation till crystallization sets in, and then cooled. By filtration and washing the crystals with ether there are obtained 20.5 gm. (84% of the theory) of 11-methyl-5,6-dihydro-6-oxomorphanthridine of melting point 202–205° C.

EXAMPLE 2

By the same process as in Example 1, but using an equivalent amount of γ-dimethylaminopropylchloride in place of β-dimethylaminoethylchloride, 5-(γ-dimethylaminopropyl) - 11 - methyl - 5,6 - dihydro-6-oxomorphanthridine hydrochloride of melting point 172–174° C. is obtained (from acetone/ethanol/ether) in a yield of 77% of the theoretical.

EXAMPLE 3

By the same process as in Example 1, but starting with 11-ethyl-5,6-dihydro-6-oxomorphanthridine in place of 11-methyl-5,6-dihydro-6-oxomorphanthridine, 5-(β-dimethylaminoethyl) - 11-ethyl-5,6-dihydro-6-oxomorphanthridine of melting point 85–88° C. (from ether/petroleum ether) is obtained.

EXAMPLE 4

A mixture of 6.44 gm. of 2-chloro-11-methyl-5,6-dihydro-6-oxomorphanthridine, 1.07 gm. of pulverized sodium amide and 50 ml. of absolute dioxane is heated for 1 hour at reflux. Then a solution of 2.6 gm. of β-dimethylaminoethylchloride in 10 ml. of absolute dioxane is added, and the whole is heated for another 4 hours under reflux. The solvent is removed from the reaction mixture by evaporation in vacuo and the residue is distributed between water and ether. The ethereal phase is extracted with diluted aqueous sulphuric acid. The acid extract is made alkaline by addition of diluted soda lye. A basic substance separates out, which is extracted with ether. By evaporating the ethereal solution in vacuo, 8.1 gm. of 2-chloro-5-(β-dimethylaminoethyl) - 11 - methyl-5,6-dihydro-6-oxomorphanthridine are obtained as an oil of boiling point 175–178° C./0.05 mm. Hg. By treatment with alcoholic hydrochloric acid, 2-chloro-5-(β-dimethylaminoethyl)-11-methyl-5,6-dihydro-6-oxomorphanthridine hydrochloride is formed, which is obtained from methanol/ether in the form of colourless crystals of melting point 246–252° C.

EXAMPLE 5

6.5 gm. of 2-chloro-11-methyl-5,6-dihydro-6-oxomorphanthridine in 60 ml. of absolute dioxane are heated at reflux for 1 hour with pulverized sodium amide, the latter being used in an excess of 7% over the theoretical amount, calculated on metallization. In order to expel as far as possible ammonia which has been formed during the reaction, about 10 ml. of dioxane are distilled off, and the still hot reaction mixture is poured into a small shaking autoclave by rinsing with a small amount of dioxane. Upon cooling to room temperature, 1.5 molar equivalents of ethylene oxide are added, and the mixture is shaken at 80° C. during 5 hours.

After cooling, the reaction mixture is concentrated to dryness in vacuo. The residue is boiled with 35 ml. of chloroform and 20 ml. of thionyl chloride during 15 hours. After evaporation to dryness in vacuo, the residue is treated with ice-water, and the resinous substance which separates out is extracted with chloroform. The combined chloroform extracts are twice washed with water, dried with sodium sulphate, and evaporated to dryness.

The resinous residue consisting of 2-chloro-5-(β-chloroethyl)-11-methyl-5,6-dihydro - 6 - oxomorphanthridine is poured into a sealed tube by means of a small amount of dioxane. 16 gm. of dimethylamine (in the form of a 33% alcoholic solution) are added, and the mixture is heated at 80° C. for 4 hours. The reaction mixture is evaporated to dryness in vacuo. The residue dissolves almost completely in warm diluted acetic acid. The solution is filtered and cleared by means of charcoal, and then the base is precipitated by addition of ammonia and extracted with ether. The combined ethereal extracts are washed with three portions of water, dried with sodium sulphate, concentrated to a smaller volume, filtered through alumina, and evaporated to dryness. The residue is dissolved in a mixture of ethyl acetate and ethanol. The solution is slightly acidified with ethanolic hydrochloric acid and then concentrated. Upon addition of ether, 2-chloro-5-(β-dimethylaminoethyl)-11-methyl - 5,6 - dihydro-6-oxomorphanthridine hydrochloride is obtained in a yield of 63% of the theory. After recrystallization from methanol/ether the product shows a melting point of 246–252° C. It is identical to the compound obtained in accordance with Example 4.

EXAMPLE 6

9.96 gm. (0.03 mole) of 2-acetylamino-5-chloro-2'-methoxycarbonyl-1,1-diphenylethane in 50 ml. of absolute dioxane are mixed with 1.29 gm. (0.033 mol) of pulverized sodium amide, and the mixture is heated under reflux for 1 hour. After addition of 3.88 gm. (0.036 mol) of β-dimethylaminoethylchloride, boing is continued for further 16 hours. The reaction mixture is evaporated to dryness in vacuo, and the residue is distributed between ether and water. A strongly basic product is isolated in the usual manner by extraction with diluted acetic acid. After distillation and crystallization from acetone/petroleum ether, 6.67 gm. of 2-chloro-5-(β-dimethylaminoethyl-11-methyl - 5,6 - dihydro-6-oxomorphanthridine are obtained, corresponding to a yield of 67.7% of the theory. The hydrochloride obtained in the usual manner shows a melting point of 246–252° C. (from methanol/ether) and is identical to the products obtained in accordance with Examples 4 and 5.

EXAMPLE 7

A mixture of 6.7 gm. of 2-chloro-5-(β-aminoethyl)-11-methyl-5,6-dihydro-6-oxomorphanthridine, 10 ml. of 90% formic acid and 8 ml. of 38% formaldehyde is boiled with gentle reflux during 15 hours. After addition of 15 ml. of 2 n-hydrochloric acid, the reaction mixture is concentrated to dryness in vacuo. The residue is recrystallized from methanol/ether, the solution being cleared with charcoal. 6.4 gm. (79% of the theoretical yield) of 2-chloro-5-(β-dimethylaminoethyl) - 11 - methyl-5,6-dihydro-6-oxomorphanthridine hydrochloride of melting point 246–252° C. are obtained, the substance being identical to the products obtained in accordance with Examples 4, 5 and 6.

By the same processes as described in the above examples, but using different starting materials, in accordance with the product intended to be obtained, the following further substances in accordance with Formula I can, for instance, be prepared:

2-chloro-5-(γ - dimethylaminopropyl) - 11 - methyl-5,6-dihydro-6-oxomorphanthridine hydrochloride of melting point 206–209° C. (from methanol/ether);

3-chloro - 5 - (β - dimethylaminoethyl)-11-methyl-5,6-dihydro-6-oxomorphanthridine hydrochloride of melting point 75–79° C. (from petroleum ether); and 3-chloro - 5 - (β - dimethylaminoethyl)-11-methyl-5,6-dihydro-6-oxomorphanthridine hydrochloride of melting point 260–264° C. (from methanol/ether).

Production of tablets

For the manufacture of tablets, the products of this invention can, for instance, be mixed with lactose and granulated with water, paraffin oil, 0.5% sodium alginate or 10% gelatine solution. The dried granulate is compressed into tablets in the presence of the usual auxiliary agents for tabletting, such as talcum, corn starch, or magnesium stearate. In this way, there are obtained, e.g. tablets of the following composition:

(A)

| | Mg. |
|---|---|
| 2-chloro-5-($\beta$-dimethylaminoethyl) - 11 - methyl-5,6-dihydro-6-oxomorphanthridine hydrochloride | 50 |
| Lactose | 180 |
| Paraffin oil | 5 |
| Gelatine | 2.5 |
| Corn starch | 8 |
| Talcum | 4.5 |

(B)

| | Mg. |
|---|---|
| 5-($\beta$-dimethylaminoethyl)-11-methyl - 5,6 - dihydro-6-oxomorphanthridine hydrochloride | 60 |
| Lactose | 40 |
| Corn starch | 5 |
| Talcum | 2 |
| Magnesium stearate | 0.1 |

These 250 mg. tablets (A) or 107 mg. tablets (B), respectively, can be administered orally in a dosage of 3 to 15 tablets per day in the treatment of subjects suffering from states of mental depression.

Production of solutions for injection

For the preparation of solutions for parenteral application by injection, the products of this invention can be dissolved in appropriate solvents, for instance, in an isotonic aqueous solution of glucose. The solution containing the active ingredient is filtered, drawn into ampoules, and the ampoules are sealed and subjected to sterilization. In this way there are obtained, e.g., ampoules containing:

2-chloro-5-($\beta$ - dimethylaminoethyl) - 11 - methyl-5,6-didihydro-6-oxomorphantharidine hydrochloride, 50 mg. Isotonic aqueous solution of glucose, ad., 5.3 ml.

The solution contained in these ampoules can, for instance, be administered intravenously to subjects suffering from states of mental depression, and the injections can be repeated once or twice per day, if necessary.

We claim:
1. A compound selected from the class consisting of: (A) 5-basic substituted 5,6-dihydro-6-oxomorphanthridines of the formula

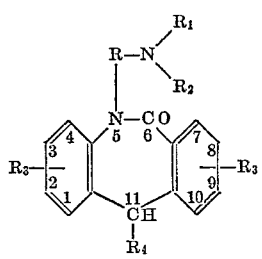

wherein R denotes straight or branched alkylene having from 2 to 4 carbon atoms, $R_1$ and $R_2$ are the same or different members of the class consisting of hydrogen and lower alkyl, one of both $R_3$ denotes hydrogen, the other $R_3$ denoting a member of the group consisting of hydrogen, halogen and lower alkyl, and $R_4$ denotes lower alkyl; and (B) therapeutically acceptable acid addition salts of (A).

2. A compound selected from the class consisting of: (A) 5-basic substituted 5,6-dihydro-6-oxomorphanthridines of the formula

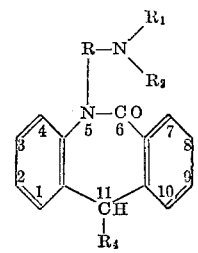

wherein R denotes straight or branched alkylene having from 2 to 4 carbon atoms, $R_1$ and $R_2$ are the same or different members of the class consisting of hydrogen and lower alkyl, and $R_4$ denotes lower alkyl; and (B) therapeutically acceptable acid addition salts of (A).

3. A compound selected from the class consisting of: (A) 5-basic substituted 5,6-dihydro-6-oxomorphanthridines of the formula wherein R denotes straight or branched alkylene having from 2 to 4 carbon atoms, $R_1$ and $R_2$ are the same or different members of the class consisting of hydrogen and lower alkyl, one of both R' denotes hydrogen, the other R' denoting halogen, and $R_4$ denotes lower alkyl; and (B) therapeutically acceptable acid addition salts of (A).

4. A compound selected from the class consisting of: (A) 2- or 3-halogenated 5-basic substituted 5,6-dihydro-6-oxomorphanthridines of the formula

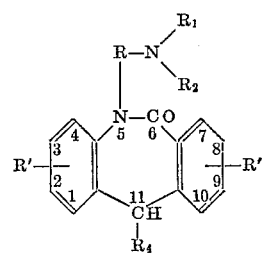

wherein R denotes straight or branched alkylene having from 2 to 4 carbon atoms, $R_1$ and $R_2$ are the same or different members of the class consisting of hydrogen and lower alkyl, hal denoting halogen, and $R_4$ represents lower alkyl; and (B) therapeutically acceptable acid addition salts of (A).

5. 5-($\beta$-dimethylaminoethyl)-11-methyl-5,6-dihydro-6-oxomorphanthridine and its therapeutically acceptable acid addition salts.

6. 5-(β-dimethylaminoethyl)-11-methyl-5,6-dihydro-6-oxomorphanthridine and its therapeutically acceptable acid addition salts.

7. 2-chloro-5-(β-dimethylaminoethyl)-11-methyl-5,6-dihydro-6-oxomorphanthridine and its therapeutically acceptable acid addition salts.

8. 3-chloro-5-(β-dimethylaminoethyl)-11-methyl-5,6-dihydro-6-oxomorphanthridine and its therapeutically acceptable acid addition salts.

References Cited

UNITED STATES PATENTS 2,973,354  2/1961  Werner _____ 260—239.3

HENRY R. JILES, *Primary Examiner.*

R. J. BOND, *Assistant Examiner.*

U.S. Cl. X.R.

424—244

PO-1050
(5/69)

UNITED STATES PATENT OFFICE
CERTIFICATE OF CORRECTION

Patent No. __3,454,561__          Dated __July 8, 1969__

Inventor(s) __Jean Schmutz et al__

It is certified that error appears in the above-identified patent and that said Letters Patent are hereby corrected as shown below:

Col. 3, line 36, after "ethylate" "potassium" (first occurence) and "lithium" insert a comma --,--; line 37, after "butoxide" insert a comma --,--; line 52, after "R" insert a comma --,--. Col. 4, line 20, "one" should read --on--; line 29, "reflux. 7.8 ml." should read --reflux. Then 7.8 ml.--; line 29, "5 N" should read --5-n--. Col. 6, line 24, "boing" should read --boiling--; line 31, "methylaminoethyl-11" should read --methylaminoethyl)-11 --; line 62, delete "hydrochloride". Col. line 38, at end of line delete "di-"; lines 50-65, that portion of formula reading

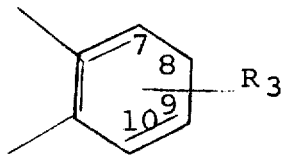          should read          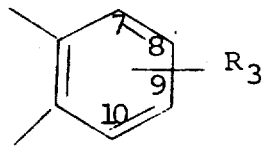

Col. 8, lines 5-15; lines 27-40; and lines 52-65; that portion of formula reading

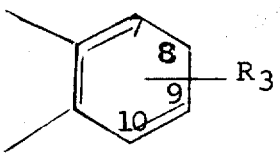          should read          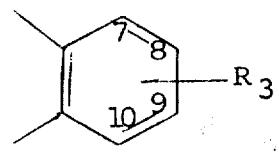

SIGNED AND SEALED
APR 14 1970

(SEAL)
Attest:

Edward M. Fletcher, Jr.
Attesting Officer

WILLIAM E. SCHUYLER, JR.
Commissioner of Patents